(12) United States Patent
Gillis

(10) Patent No.: US 7,997,162 B1
(45) Date of Patent: Aug. 16, 2011

(54) HANDLE BAR EXTENSION

(76) Inventor: Keith Louis Gillis, Traverse City, MI (US)

( * ) Notice: Subject to any disclaimer, the term of this patent is extended or adjusted under 35 U.S.C. 154(b) by 1407 days.

(21) Appl. No.: 11/221,077

(22) Filed: Sep. 7, 2005

(51) Int. Cl.
*B62K 21/12* (2006.01)
(52) U.S. Cl. .................................................... 74/551.8
(58) Field of Classification Search ...... 74/551.1–551.8; 403/92, 93, 96, 97, 322.1, 322.4; 280/279, 280/280
See application file for complete search history.

(56) References Cited

U.S. PATENT DOCUMENTS

| | | | | |
|---|---|---|---|---|
| 6,035,741 A | * | 3/2000 | Krizman, Jr. | 74/551.8 |
| 6,953,201 B1 | * | 10/2005 | VanDeMortel | 280/276 |
| 2005/0066766 A1 | * | 3/2005 | Truchinski | 74/551.1 |

* cited by examiner

*Primary Examiner* — Vicky A Johnson
(74) *Attorney, Agent, or Firm* — Robert L. McKellar; McKellar IP Law, PLLC

(57) ABSTRACT

The instant invention is a handlebar extension that attaches to the top of a standard motorcycle or comparable vehicle allowing the user to secure the handlebars while positioning the handlebars at an elevated position and moving them forward, away from the rider. This is achieved by the presences of offset openings in the second component of the handle bar extensions. The handlebar extension attaches to existing openings of the motorcycle while the offset feature gives a height and distancing factor. The extensions have a plurality different size opening to accommodate a variety of different handlebars. The extensions themselves have a plurality of sizes as well to accommodate different applications.

4 Claims, 3 Drawing Sheets

HANDLE BAR EXTENSION

The present invention is a handlebar extension that mounts to the existing openings of the top plate of a standard motorcycle. Because the second component configuration is slightly larger that the first, and has offset mounting openings it allows the user to attach the handlebars at a higher elevation and with a greater distance from the user than current mounting mechanisms. The circular enclosure formed from conjoining the first and second components has a plurality of sizes allowing for a multitude of different size handlebars being accepted by the device.

BACKGROUND OF INVENTION

The present invention is directed to handlebar extensions for motorcycles or comparable vehicles. Specifically it is directed to an apparatus that mounts directly to stock motorcycle equipment and accommodates a wide variety of handlebar diameters. More specifically, it allows the direct attachment of handlebars to stock equipment by effectively moving the handlebars up and forward away from the rider, providing for more room than the current extension methods provide. There is a large aftermarket industry that provides enthusiasts with a plurality of different shapes, sizes and styles of handle bars that are attachable to these vehicles. The present invention allows for greater flexibility through a quick replacement with any style of handlebar regardless of its make, whether it is factory or aftermarket.

THE INVENTION

The invention is a handlebar extension comprising in combination, a first component and a second component with at least two fasteners.

The first component of the invention has a near end, a distal end, a top surface, a bottom surface, a front surface, a rear surface, a near end surface, a distal end surface, an arcuate opening therethrough and an arcuate opening inside surface.

The first component has at least two openings therethrough from the top surface to the bottom surface.

The arcuate opening extends from the front surface to the rear surface and opens through the bottom surface.

The second component has a near end, a distal end, a top surface, a bottom surface, a front surface, a rear surface, a near end surface, a distal end surface, a second arcuate opening and a second arcuate opening inside surface.

The second component has at least two openings through it that align with the openings in the first component. The top surface of the second component not surmounted by the first component has an opening through it, which opening has a counter sunk top portion.

The second arcuate opening extends from the front surface to the rear surface and opens into the top surface of the second component.

The second arcuate opening inside surface has an opening through it extending from the arcuate opening inside surface to the bottom surface, such being counter sunk.

The first component is surmountable on the second component in a manner that when combined, the two components form a circular enclosure, the circular enclosure is configured to accept different handlebar sizes and configurations.

The combination of the first component and the second component is attachable to a motorcycle handlebar support rod.

DETAILED DESCRIPTION OF THE DRAWINGS

Figure 1:
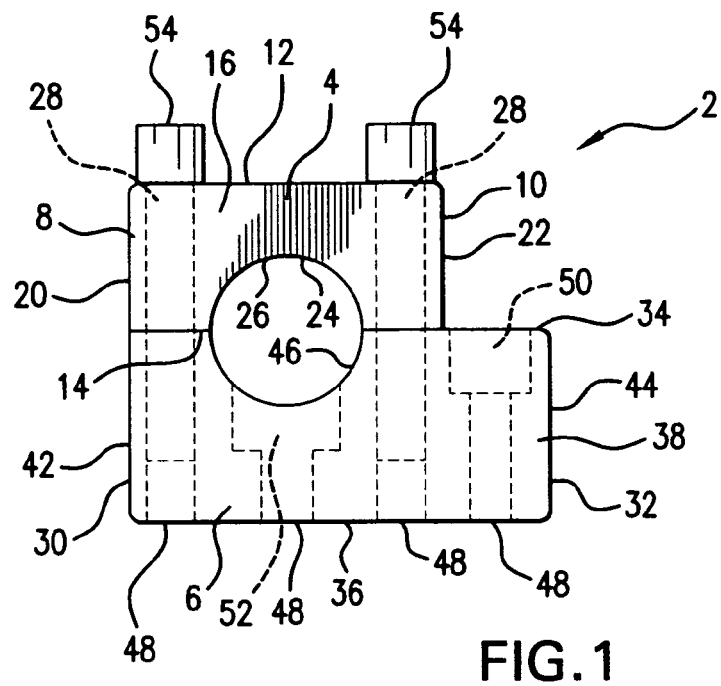
FIG. 1 is a full side view of the handlebar extension with fasteners openings and countersinking in phantom

FIG. 1 is a full side view of the handlebar extension 2 assembled with the fasteners shown in phantom. With the addition of fasteners 54 the assembled parts of the first component 4 and the second component 6 combine to form the handlebar extension 2. The first component 4 consists of a near end 8, a distal end 10, a top surface 12 and a bottom surface 14. The first component 4 also contains a front surface 16, a near end surface 20, a distal end surface 22, an arcuate configuration 24, an arcuate configuration inside surface 26 and a plurality of openings 28 therethrough.

The second component 6 has a near end 30, a distal end 32, a top surface 34, a bottom surface 36 and a front surface 38. Also present is the near end surface 42, a distal end surface 44, an arcuate configuration 45, an arcuate configuration inside surface 46 and openings 48 therethrough. Also present on the second component 6 is a counter sunk opening 50 from the top surface 34 superimposed over opening therethrough 48. There is another counter sunk opening 52 on the inside surface 46 of arcuate configuration 45 that is superimposed over the opening 48.

Figure 2:
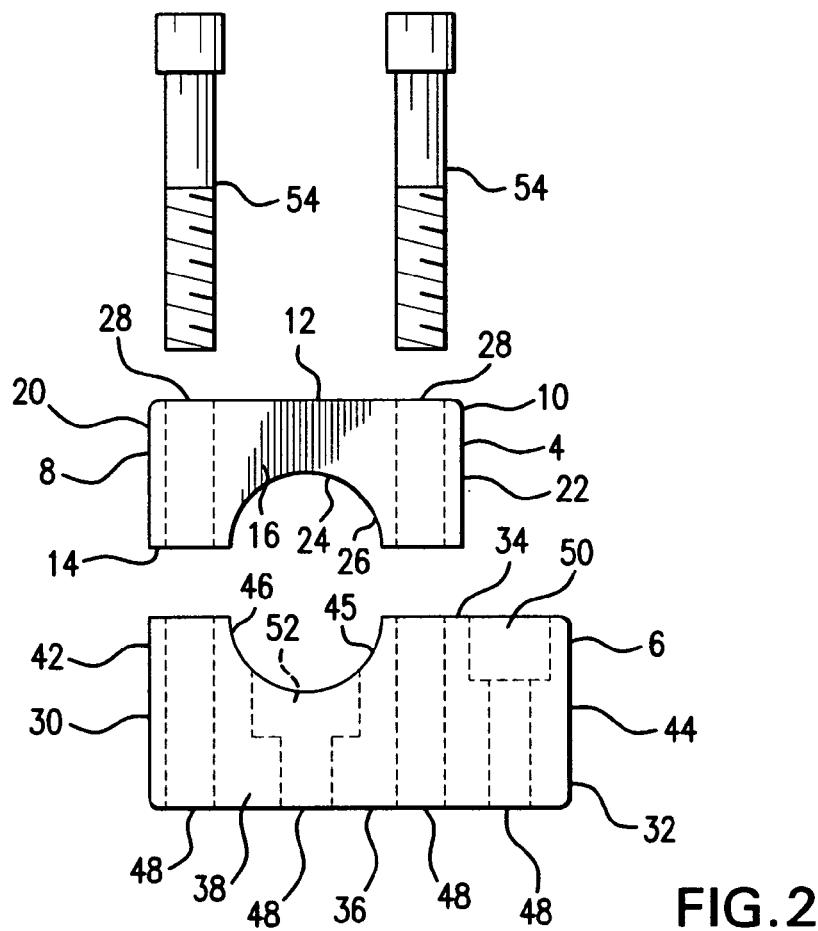
FIG. 2 is a full side break away view of the handlebar extension with openings and countersinking in phantom

FIG. 2 is a full side break away view of the handlebar extension showing the fasteners in phantom. This particular view shows the first component 4 and the second component 6 unassembled. The first component 4 consisting of a near end 8, a distal end 10, a top surface 12 and a bottom surface 14. The first arcuate configuration 4 also consists of a front surface 16, a near end surface 20, a distal end surface 22, an arcuate configuration 24, an arcuate configuration inside surface 26 and a plurality of openings 28 therethrough.

The second component 6 has a near end 30, a distal end 32, a top surface 34, a bottom surface 36 and a front surface 38. Also present is the near end surface 42, a distal end surface 44, an arcuate configuration 45, an arcuate configuration inside surface 46 and openings 48 therethrough. These openings can be threaded. Also present on the second component 6 is a counter sunk opening 50 from the top surface 34 superimposed over the openings 48. There is another counter sunk opening 52 on the arcuate configurations inside surface 46 of the arcuate configuration 45 that is superimposed over opening 48. This view also shows the fasteners 54. This view shows how the two components can be separated to accommodate the handlebars then aligned over one another and secured around the handlebars. The handlebars then are secured to the motorcycle or comparable vehicle.

Figure 3:
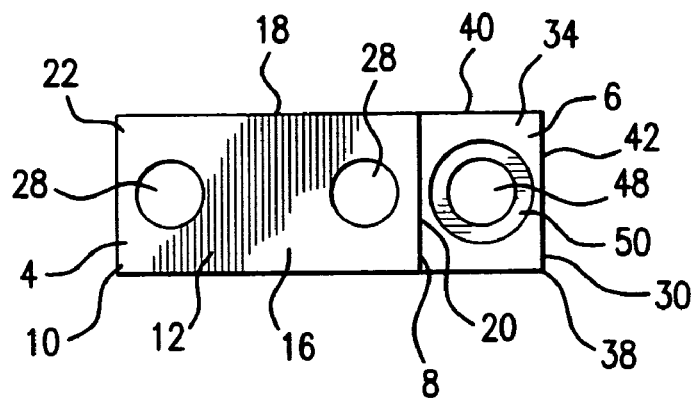
FIG. 3 is a full top view of the handlebar extension

FIG. 3 is a full top view of the handlebar extension 2. Present is the first component 4 and the second component 6 aligned. The features of the first component 4 are a near end 8, a distal end 10, a top surface 12, a front surface 16, a rear surface 18, a near end surface 20, a distal end surface and openings therethrough 28. The features of the second component 6 are a near end 30, a top surface 34, a front surface 38, a rear surface 40; an openings therethrough 48, counter sunk opening 50 and counter sunk opening 52. This view shows the first component 4 aligned with the second component 6, also presents the opening 48 with the counter sunk portion 52.

This represents the offset feature that makes the handlebar extension unique. Through this opening 48 the handlebar extension 2 is secured to the motorcycle. The configuration of the handlebar extension 2 allows the extension to attach to the motorcycle effectively moving the handlebar position forward and elevated.

Figure 4:
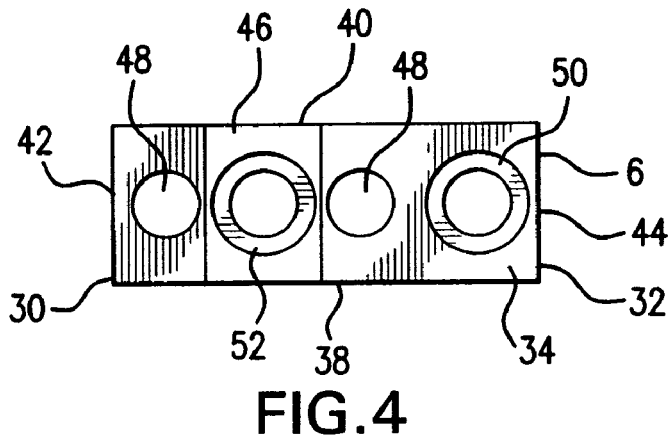
FIG. 4 is a full top view of the second component

FIG. 4 is a full top view of the second component 6. There is a near end 30, a distal end 32, a top surface 34, a front surface 38, a rear surface 40, a near end surface 42, a distal end surface 44, an arcuate configuration 45, an arcuate configurations inside surface 46, openings 48 therethrough, a counter sunk opening 50 and counter sunk opening 52 on the arcuate configuration inside surface 46 of arcuate configuration 45. Openings 48 are available for fasteners 54 inserted through the first component 4. The fasteners 54 penetrate the first component through openings 28 being secured within the second component 6 openings 48 that are threaded. This attaches the first component 4 to the second component 6. The counter sunk opening 50 and 52 are available to accept fasteners that will attach the handlebar extension 2 to the motorcycle or comparable vehicles.

Figure 5:
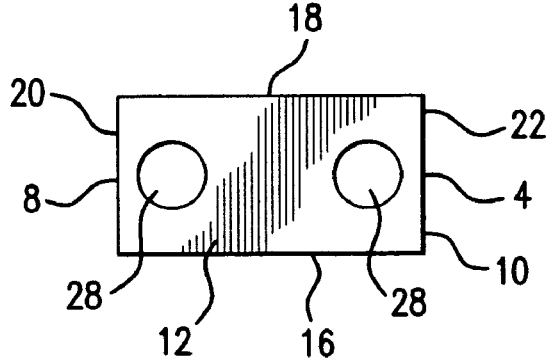
FIG. 5 is a full top view of the first component

FIG. 5 is a full top view of the first component 4. Also shown is the near end 8, a distal end 10, a top surface 12, a front surface 16, a rear surface 18, a near end surface 20, a distal end surface 22 and the openings 28.

Figure 6:
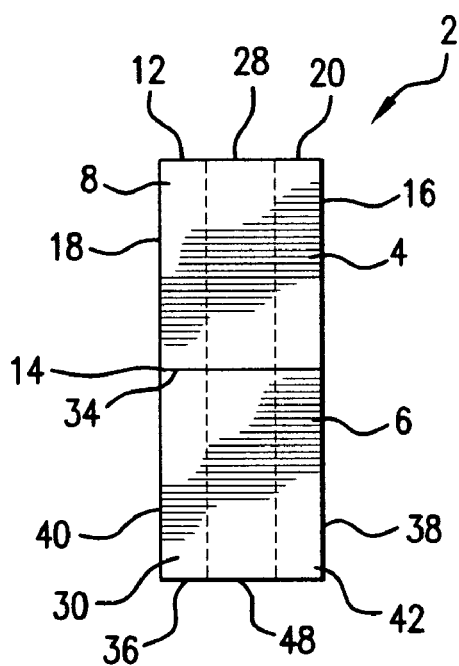
FIG. 6 is a full side view of the handlebar extensions near end showing opening in phantom
Figure 8:
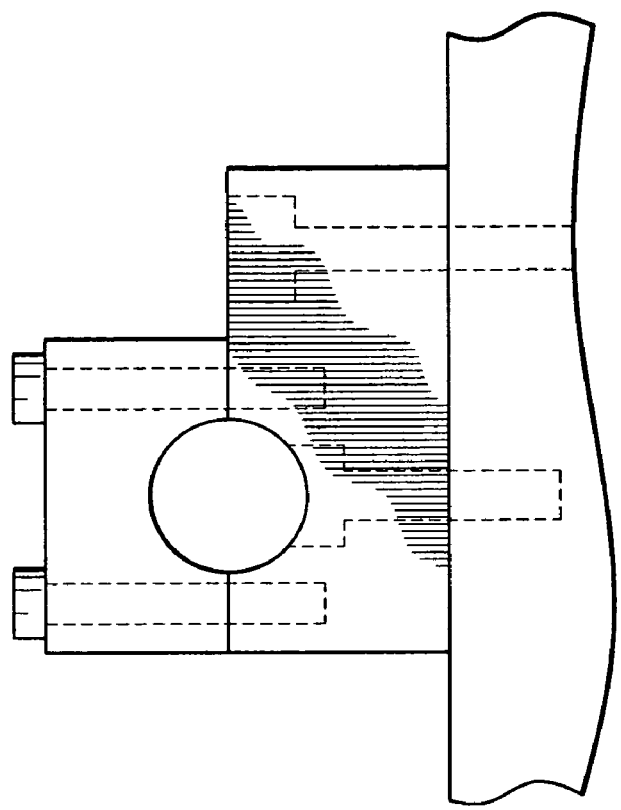
FIG. 8 is a front view of the invention
Figure 7:
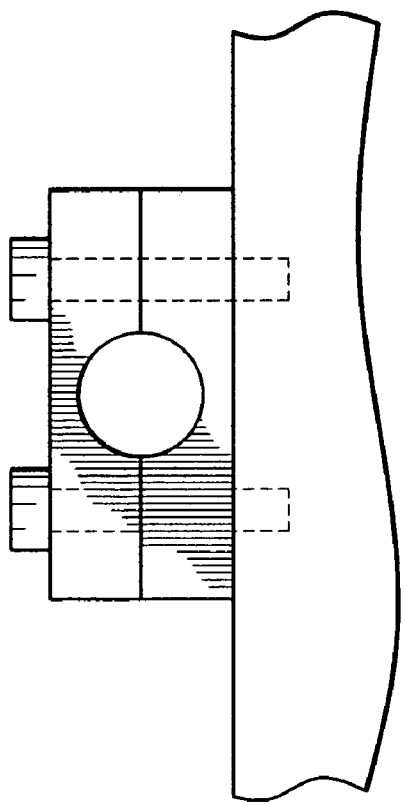
FIG. 7 is a front view of the prior art

FIG. 6 is a full end view of the handlebar extension 2. The first component 4 near end 8 is joined with the second component 6 near end 30. Also visible is the top surface 12. The bottom surface 14 of the first component 4 meets the top surface 34 of the second component 6. Also present are the front surface 16, a rear surface 18 and near end surface 20 of the first component 4. The openings 28 are shown in phantom. Portion of the second component 6 are shown including the bottom surface 36, a front surface 38, a rear surface 40, a near end surface 42 and openings therethrough 48.

The present invention is a two component mount for mounting a large variety of handlebars to a wide variety of motorcycles and similar vehicles. The second component has a plurality of openings for receiving fasteners from the first component and at least two to secure the second component to the vehicle. The second component is secured to the vehicle, and then the handle bars are fitted into the arcuate configuration 45 of the second component against the arcuate configuration inside surface 46 of the second component arcuate configuration 45. Then the first component is aligned over the bottom component or second component and secure to the second component. The diameter of the enclosed circular space that is formed from conjoining of the two components varies in size to accommodate various manufacturers and the large variety of aftermarket products. This allows the user to pick specific products knowing that the handle bar extension will accommodate the individual choice. The mounting will attach to any standard motorcycle or similar vehicles. It also places the handlebars forward of their previous position and higher, providing greater clearance for the rider.

What is claimed is:

1. A handlebar extension comprising in combination a first component, a second component and at least two fasteners,
   said first component having a near end, a distal end, a top surface, a bottom surface, a front surface, a rear surface, a near end surface, a distal end surface, an arcuate opening therethrough and an arcuate opening inside surface;
   said first component having at least two openings therethrough from the top surface to the bottom surface;
   said arcuate opening extending from said front surface to said rear surface and opening through the bottom surface;
   said second component being larger than the first component and having a near end, a distal end, a top surface, a bottom surface, a front surface, a rear surface, a near end surface, a distal end surface, a second arcuate opening and a second arcuate opening inside surface,
   said second component having at least two openings therethrough that align with the openings in the first component; the top surface of the second component not surmounted by the first component, having an opening therethrough, which opening has a counter sunk top portion, said openings being threaded;
   said second arcuate opening extending from said front surface to said rear surface and opening into said top surface of the second component,
   said second arcuate opening inside surface having an opening therethrough extending from the arcuate openings inside surface to the bottom surface, such being counter sunk;
   said first component being surmountable on the second component in a manner that when combined, the two components form a circular enclosure, said circular enclosure configured to accept different handlebar sizes and configurations, said circular enclosure being offset from the opening in the top surface of the second component not surmounted by the first component, wherein the central axis of the circular opening is vertically aligned with the opening in the second arcuate opening, thereby allowing attachment of handle bars at a higher elevation and a greater distance from the user;
   the combination of the first component and the second component being surmountable to a motorcycle handlebar support rod.

2. A handlebar extension as claimed in claim 1 wherein, the handlebar extension is manufactured of material selected from the group consisting of, metal, aluminum, stainless steel, titanium, platinum, plastic, composite plastic, carbon, carbon fiber, carbon composite.

3. A handle bar extension as claimed in claim 1 wherein, the handlebar extension is manufactured in a variety of sizes.

4. A handlebar extension as claimed in claim 1 wherein, the handlebar extension fits a vehicle selected from the group consisting of motorcycles, ATV's, bicycles, hydrobikes, snowmobiles and wave runners.

* * * * *